United States Patent [19]
MacKenzie

[11] 3,851,983
[45] Dec. 3, 1974

[54] COUPLING
[76] Inventor: Kenneth H. MacKenzie, 3 Morgan Ter., East Haven, Conn.
[22] Filed: Feb. 20, 1973
[21] Appl. No.: 334,028

[52] U.S. Cl. .............................. 403/312, 115/34 R
[51] Int. Cl. ........ F16b 7/00, F16d 1/00, F16l 21/00
[58] Field of Search .... 115/34 R, 34 A, 34 B, 34 C; 403/312, 310, 309, 313, 311

[56] References Cited
UNITED STATES PATENTS
| | | | |
|---|---|---|---|
| 73,100 | 1/1868 | Hubbard | 403/309 |
| 111,152 | 1/1871 | Smith | 403/312 |
| 1,806,687 | 5/1931 | Hoover | 403/312 |
| 3,554,589 | 1/1971 | Boggs | 403/313 |
| 3,583,356 | 1/1971 | Barker | 403/312 X |

Primary Examiner—Geo. V. Larkin
Attorney, Agent, or Firm—DeLio and Montgomery

[57] ABSTRACT

A coupling for detachably connecting a driven shaft to a drive shaft where the coupling comprises a sleeve-like member having diametrical slots from both ends thereof which may be independently tightened about each shaft.

3 Claims, 4 Drawing Figures

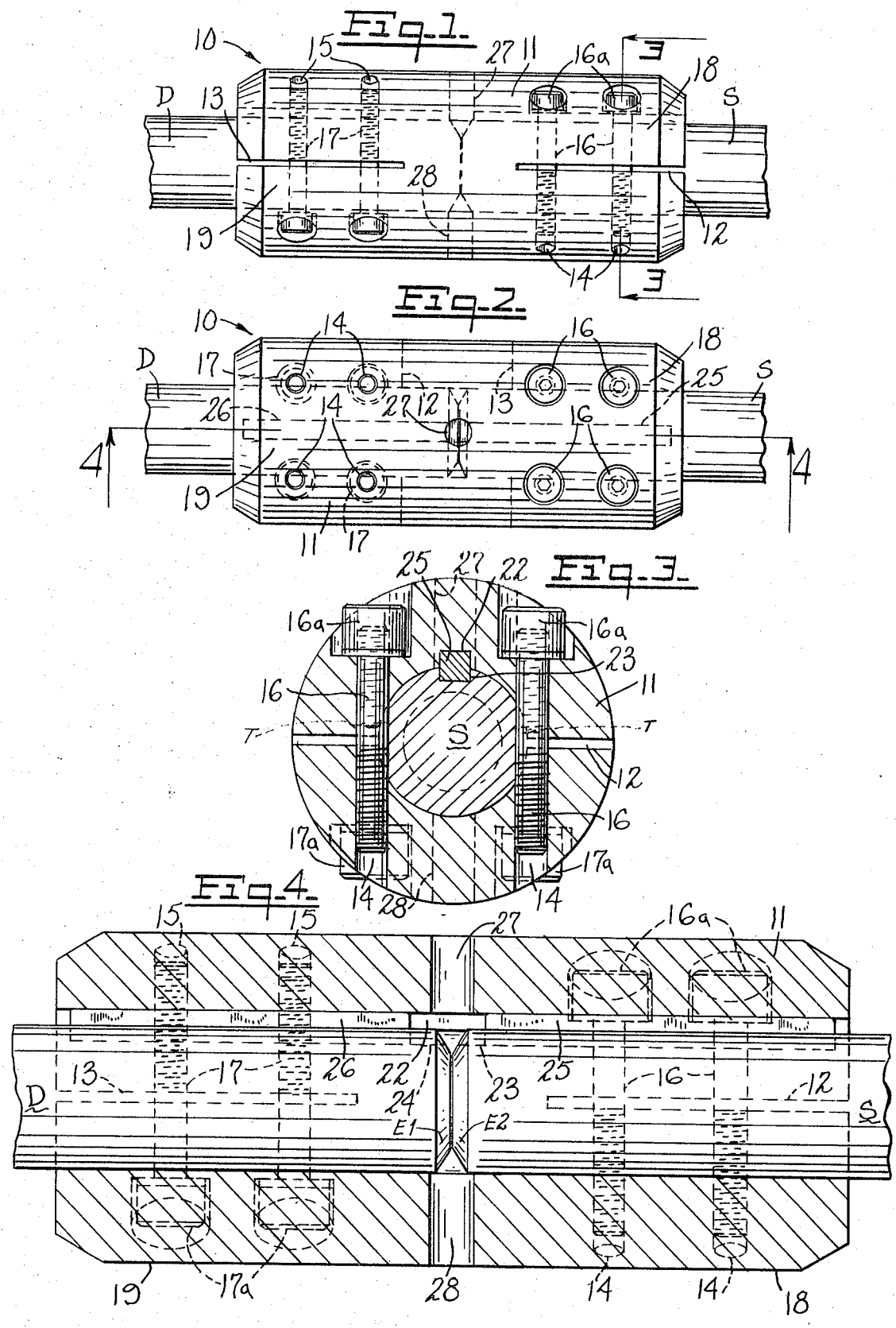

COUPLING

This invention relates to couplings and more particularly relates to a coupling adapted to connect a stub shaft to a drive shaft.

In marine applications, a stub or screw shaft is coupled to a drive shaft through a coupling member to allow removal and replacement of the screw shaft should it become bent or otherwise damaged.

The couplings presently in use generally comprise a sleeve-like member which is slotted along its length on one side thereof or which is made in two half sleeves with screws extending into the coupling through the slot so that the coupling may be clamped or compressively tightened about the ends of the shafts.

This type of coupling suffers from limitations in that with the through slot a taper may be developed in the internal periphery of the coupling if there is a small difference in tolerance in the diameter of the shafts. This difference in tolerance is not uncommon and may result in a taper in the shaft such that the surface engagement or clamping area between the shafts and the internal peripheral surfaces of the sleeve are minimized. Additionally, when it is necessary to replace the stub shaft, this type of coupling requires that the boat upon which it is mounted be taken out of the water for purposes of access.

The present invention provides a new and improved coupling for shafts of the type described in which one end of the coupling may be tightened upon a shaft independent of the other end and differences in diameter of the shafts present no problem. The present invention further provides a coupling in which the stub shaft may be removed therefrom under water and a new stub shaft replaced while the vessel is in the water, assuming the availability of experienced underwater technicians. This obviates the necessity of hauling the boat.

Briefly stated, the invention in one form thereof comprises a sleeve-like member having an internal bore of constant diameter where the sleeve-like member is longitudinally slotted at diametrically opposite positions from both ends a predetermined distance thereof toward the center. Screws are threadably received in the sleeve-like member and extend through the slots so that when shafts are inserted from both ends of the sleeve each end of the sleeve may be independently clamped about one of the shafts while providing a solid driving connection between the shafts. Diametrically directed apertures are provided through the coupling in the center thereof to permit a tool to be inserted so that one shaft may be longitudinally started for removal.

An object of this invention is to provide a new and improved coupling of the type described which permits each end thereof to be independently clamped about the end of a shaft.

Another object of this invention is to provide a coupling of the type described which facilitates connection and disconnection of a shaft thereto.

A further object of this invention is to provide a coupling of the type described which will accept shafts having variations in diameter.

The features of the invention which are believed to be novel are particularly set forth and distinctly claimed in the concluding portion of this specification. The invention, however, both as to its operation and organization together with further objects and advantages thereof, may best be appreciated by reference to the following detailed description taken in conjunction with the drawings, wherein:

FIG. 1 is a view showing a coupling embodying the invention in combination with two shafts to be coupled;

FIG. 2 is a view of a coupling of FIG. 1 which has been rotated 90°;

FIG. 3 is a sectional view seen in the plane of lines 3—3 of FIG. 1; and

FIG. 4 is a sectional view seen in the plane of lines 4—4 of FIG. 2.

A coupling 10 embodying the invention comprises a sleeve-like member 11 having a bore or passage therethrough adapted to receive shafts D and S from opposite ends of the coupling. A pair of diametrically opposite slots 12 and 13 are defined through the walls thereof from each end of the coupling toward the center a portion of the length and defining a solid driving connection between the ends of the slots. Extending through the sleeve perpendicular to the longitudinal axis through slots 12 thereof are threaded screw openings 14. Extending through the other end of the sleeve and slots 13 are screw openings 15. Screws 16 and 17, preferably of the socket head type, are threadably received in openings 14 and 15, respectively. The screw openings are countersunk on opposite sides of the sleeve to receive the heads 16a and 17a of screws 16 and 17, respectively. The shafts D and S are tangentially grooved as indicated by T in FIG. 3 to permit the screws 16 and 17 to reside within the outline of the outer periphery of the shafts for reasons hereinafter pointed out.

The sleeve member is made slightly oversize for the size shafts it is adapted to couple. For example, if the shafts are 1.750 inches the internal diameter of the sleeve may be 1.754 inches to allow greater area for holding or clamping surface contact.

The construction of sleeve 11 is such that by tightening screws 16 and 17 in sockets 14 and 15, the end portions 18 and 19 may each be compressively clamped about shafts S and D, respectively, independent of any clamping action on the other end. This ability to independently clamp each end of the coupling to a shaft facilitates the coupling of shafts of slightly different diameter while maintaining a large area of surface contact of the sleeve on the shafts.

A keyway 22 is defined into the internal periphery of sleeve 11 and keyways 23 and 24 are defined in shafts S and D, respectively, to receive key 25 between shaft D and coupling 10 and key 26 between shaft S and coupling 10.

The ends E1 and E2 of shafts S and D respectively are preferably bevelled and the ends abut midway through sleeve 11 as shown in FIG. 4. To facilitate separation of the shafts, openings 27 and 28 are radially defined in sleeve 11 at the longitudinal midpoint thereof. This will permit insertion of a tool between the ends of shafts S and D to start movement of one relative to the other to remove a shaft from the coupling. Prior to this being done, of course, it is required that the screws be backed off in sockets at the end receiving the shaft to be removed.

To assemble the coupling to the two shafts, the coupling is first put on shaft D with key 26 therein and the screws 17 tightened to cause that end of the shaft to compressively engage shaft D along a large area of contact. Shaft D has previously been grooved tangentially thereof to permit the passage of the screws. This will also locate the end of the shaft beneath the apertures 27 and 28. Then the shaft S which may be considered the stub shaft is inserted into the coupling together with key 25. Screws 16 are then tightened to cause that end of coupling 10 to compressively engage shaft S. Then the coupling is applied and ready for service.

Assume that it is necessary to remove shaft S, the screws 16 are backed off so they would not interfere with the removal of shaft S. Then if shaft S cannot be easily pulled from the coupling a wedging tool may be inserted into one of the apertures 27 or 28 to start shaft S. Thereafter, shaft S is merely pulled from the sleeve 11 and a replacement inserted.

The screws 16 and 17 positioned in the tangential grooves in the shafts D and S prevent an undesired or unwanted longitudinal separation of the shafts when the drive is reversed.

The disclosed coupling is inherently balanced due to its method of manufacture. The passage is first defined by boring and honing the shaft receiving passage, then turning the outer periphery about the axis of the passage. This construction also provides a solid coupling. The clamping screws are directionally oriented to complement the inherent balance.

It may thus be seen that the objects of the invention set forth as well as those made apparent from the preceding description are efficiently attained. While preferred embodiments of the invention have been set forth for purposes of disclosure further embodiments of the invention as well as modifications to the disclosed embodiments which do not depart from the spirit and scope of the invention may occur to others skilled in the art. Accordingly, the appended claims are intended to cover all embodiments and modifications of the invention which do not depart from the spirit and scope of the invention.

What is claimed is:

1. For use in combination with a drive and a driven shaft, a coupling comprising a one-piece sleeve member having a continuous bore therethrough, a pair of slots defined in said sleeve member at each end thereof and extending longitudinally inwardly of said sleeve member, the slots of each pair terminating in said sleeve short of each other, said pairs of slots permitting each end of said coupling to be tightened on a shaft independent of the other end, threaded screw holes extending through said coupling and bridging each of said slots, a screw received in each of said holes, said screws being effective to clamp the slotted ends of said coupling about each of said shafts.

2. The combination of claim 1 wherein said shafts have tangential grooves defined in the periphery thereof which partially receive said screws.

3. The combination of claim 1 wherein said sleeve member has at least one opening in the wall thereof intermediate the interior end of the slots, the ends of the shafts in said sleeve member residing below said at least one opening.

* * * * *